United States Patent [19]

Sundberg et al.

[11] 4,054,402
[45] Oct. 18, 1977

[54] APPARATUS FOR PRODUCING TUBULAR SHEATH-LIKE COVERINGS FOR ELECTRODES

[75] Inventors: Erik Sundberg; John Andersson, both of Nol, Sweden

[73] Assignee: Aktiebolaget Tudor, Sundbyberg, Sweden

[21] Appl. No.: 662,916

[22] Filed: Mar. 1, 1976

[51] Int. Cl.² .............................................. B29C 17/00
[52] U.S. Cl. ........................................ 425/3; 425/392; 425/403; 425/DIG. 33
[58] Field of Search ................. 264/24, 134, 136, 137; 425/3, 403, 392, DIG. 33

[56] References Cited

U.S. PATENT DOCUMENTS

| 2,324,645 | 7/1943 | Prehler | 264/136 X |
| 2,418,974 | 4/1947 | Henry | 264/136 |
| 3,565,983 | 2/1971 | Eigenmann | 264/137 X |
| 3,725,130 | 4/1973 | Anderson | 29/2 |

FOREIGN PATENT DOCUMENTS

| 2,515,556 | 1975 | Germany | 136/13 |

*Primary Examiner*—J. Howard Flint, Jr.
*Attorney, Agent, or Firm*—Burns, Doane, Swecker & Mathis

[57] ABSTRACT

An apparatus for supporting a sheathing material comprises a mandrel containing magnetically conductive material, and a plurality of spaced magnets. The magnets contain aligned circular apertures. The mandrel is centered within the apertures by a magnetic field applied substantially uniformly around the periphery of the mandrel. The mandrel is thus supported in a freely suspended manner. Sheathing material can be inserted onto the freely suspended mandrel and advanced freely therealong so as to be treated while mounted on the mandrel.

3 Claims, 5 Drawing Figures

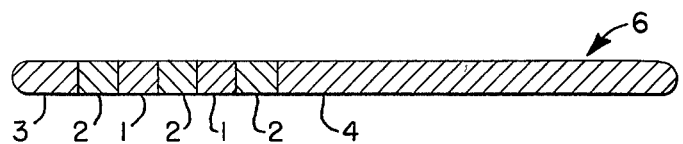
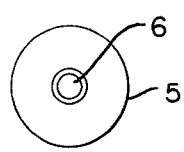
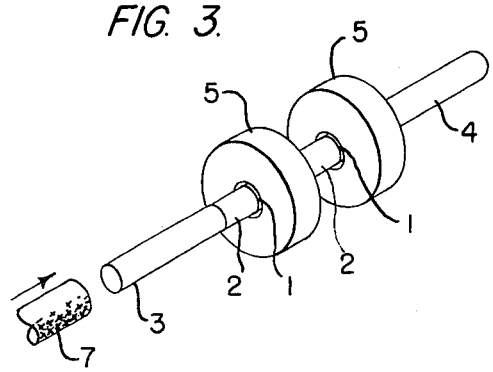
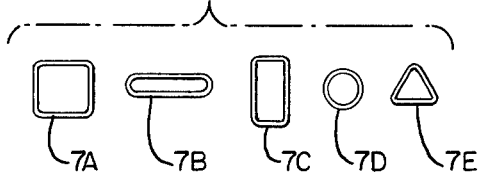
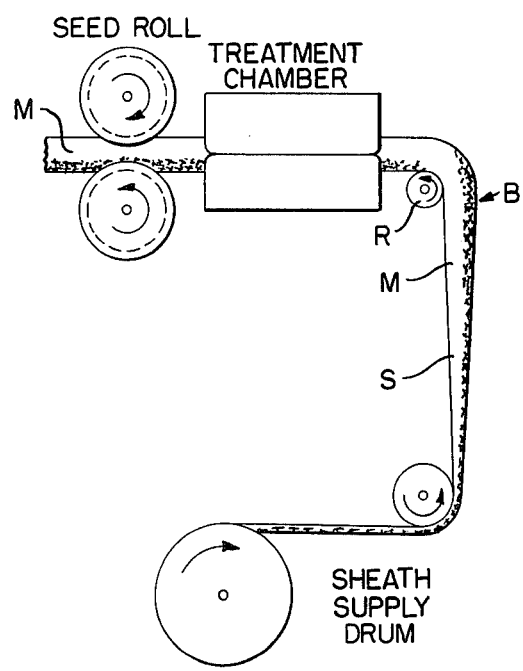

APPARATUS FOR PRODUCING TUBULAR SHEATH-LIKE COVERINGS FOR ELECTRODES

BACKGROUND AND OBJECTS

This invention relates to an apparatus for the production of tubular sheaths for tubular electrodes with differing geometrical cross-sections. Such tubular sheaths can be of many different types and be produced in different ways. Particularly, the invention relates to such tubular sheaths as are formed on a mandrel.

It is heretofore known to form tubular sheaths for tubular electrodes for electrical storage batteries on mandrels by different processes and starting from different sheath material. For example, see disclosures in commonly assigned U.S. Pat. Nos. 2,896,006; 3,725,130; and 3,801,399. These operations have been carried out both by continuous methods and by discontinuous methods.

Discontinuous methods are applied for example with a preliminary stiffening of the tubular sheath, the latter consisting of a mat of woven-together tube and thermoplastic, or mainly thermoplastic fibres. The procedure adopted in such cases is to cut or punch pieces of the tubular mat having a length somewhat exceeding the desired length of the final product. In each tubular channel of the mat there is inserted a mandrel, and the mat is subjected to the desired treatment which may be a heat treatment or an impregnation or a combination of these. After this, the mandrels are withdrawn and the mat is cut to the desired length.

In the case of continuous tube production, the tubular sheath material is fed in the form of an endless belt over a mandrel which in some way is held still. In one known arrangement, disclosed for example in the above-mentioned U.S. Pat. No. 2,896,006 and depicted therein in FIG. 5, the holding of a mandrel M can be effected for example by the mandrel being designed with a bend B at the end where the feeding-on of the sheath material S takes place, with such bend being arranged to hold the mandrel in place over a disc or roller R. Attention is directed to commonly assigned U.S. Pat No. 3,725,130 for an example of such an arrangement. The holding-still of the mandrel can also be effected by the mandrel at its feed-in end having a narrower section, and wherein it is held in place by rollers or wheels going transversely across the mandrel and disposed in pairs with a gap therebetween which is less than the largest diameter of the mandrel but greater than the smallest diameter of the mandrel.

All of the methods described above involve certain disadvantages. As regards the discontinuous methods, it is obvious that these methods are, on the one hand, demanding in respect of labor required, and on the other hand give rise to an unnecessary waste of material. Concerning the continuous methods described above, there occurs to some extent an undesirable action on the sheath material resulting from the arrangement for holding the mandrel in position; and as a result of this, furthermore, such methods involve unnecessary technical complications for feeding and treating the sheath material.

It is, therefore, an object of the present invention to provide novel apparatus for treating mandrel-mounted sheath material which avoids undesirable action upon the sheath by the mandrel-supporting mechanism.

It is another object to provide such novel apparatus for treating sheaths of different cross-sectional configurations.

It is a further object of the invention to provide such apparatus which minimizes relative displacement of braided threads in the sheath.

It is yet another object of the invention to provide such novel apparatus wherein the sheath-supporting mandrel is suspendingly supported in a manner having minimal disruptive effects on the sheath.

BRIEF SUMMARY

The present invention relates to apparatus for producing tubular sheaths for tubular electrodes for electrical storage batteries, by which the above-mentioned disadvantages are obviated. The invention also relates to an apparatus for carrying out the process. A special advantage of the apparatus according to the invention is that it makes it possible to produce tubular sheaths with any geometrical cross-section chosen at will.

More particularly, according to the invention the material for the tubular sheaths is fed in the form of a continuous belt over a freely suspended mandrel and is formed while on this mandrel. Afterwards, it is cut off in the desired length. Because of the mandrel being freely suspended, this can be effected by feeding the sheath in a straightaway path of travel; also, the cross-section of the sheath can be chosen in accordance only with criteria for obtaining the best possible product, rather than other inconvenient considerations which must be taken into account with previously known devices such as avoiding problems resulting from the manner of mounting the mandrel and so on. It has been found particularly suitable for the mandrel to be held in position magnetically. This can be effected both with permanent magnets and electromagnets, and with both a stationary and a rotary magnetic field. By the expression rotary magnetic field, reference is not being made here to the various types of magnetic field which are obtained when using alternating current for electromagnets, apart from a magnetic field of the kind which is generated in linear motors. Rather, by the term rotary magnetic field is meant a field which is generated in a circular path so as to center the mandrel. An electromagnetic holding arrangement has the further advantage that in this way the mandrel material is heated by the electromagnetic field which in turn conveys heat to the material for the tubular sheath. In this way, there is obtained on the one hand a drying of the material in the event of its having to be moistened; and on the other hand a heating which permits an accelerated procedure in the subsequent stages of the process and hence an increased output capacity in the process of production.

THE DRAWINGS

The process and apparatus will be described in more detail in what follows with reference to the figures.

FIG. 1 shows longitudinal cross-section of a mandrel designed for being held magnetically;

FIG. 2 is an end view depicting how such a mandrel is disposed within a circular magnet;

FIG. 3 is an isometric view showing part of a mandrel which is held by two circular magnets;

FIG. 4 is an end view of a number of possible configurations of tubular sheaths which can be formed by the present invention; and FIG. 5 is an schematic illustration of a prior art arrangement of supporting a mandrel.

DETAILED DESCRIPTION

Referring to FIG. 1, a preferred mandrel 6 according to the invention comprises a feed-in portion 3 and a forming and discharge portion 4. Between these portions there is located a number of parts of essentially magnetically non-conductive material 2, between which there are disposed parts of magnetically conductive material 1.

For supporting the mandrel there are provided a plurality of magnets 5 having aligned, circular, mandrel-receiving apertures located centrally therein. The mandrel is situated such that the magnetically conductive parts 1 are disposed within the apertures and are thereby encircled by the magnets 5. The magnetic forces are thus uniformly applied about the periphery of the mandrel 6 to center the mandrel in an essentially stationary position. The magnets 5 can be of the permanently magnetized type, or can be electromagnets, the strength of the magnetic field depending upon the mandrel weight and forces applied thereto, among other factors.

Through the encircling arrangement of magnetically conductive material 1 with circular magnets 5, the presently sought-after effect is attained, namely that the mandrel remains freely suspended in the middle of the apertures by such magnets. The number of magnets and associated components of magnetically conductive material 1, and the nature of the magnets in different applications, is decided with reference to the forces which are desired to act on the mandrel. In this way, it is attained as shown in FIG. 2, that the mandrel 6 tends to remain held in the centre of the magnet 5.

For the magnetically conductive material 1, there is chosen a suitable steel and for the magnetically non-conductive material 2 there can be chosen for example, copper or aluminium or alloys of these; ceramic or polymer materials may also conceivably be used. The feed-in part 3, and the forming and discharge part 4 of the mandrel 6 can be made of any conveniently suitable material without reference to the holding arrangements. That is, there is no need to utilize materials that would be compatible with mechanisms formerly proposed for holding the mandrel in place. Rather, such materials can be freely selected in accordance with other requirements.

In order to attain the greatest possible holding power and retaining effect on the mandrel 6, the gap between the outer mandrel surface and the inner magnet surface must be small. It must, however, at least be large enough for the tubular sheath 7 material to be able to pass over the mandrel 6 and through the magnets 5.

The invention is especially advantageous when utilizing a tubular sheath 7 produced from a plaited or braided material with what are called "warp threads". In the sheath of braided material, the threads cooperating in the braiding are arranged so as to take a helical form. The same number of threads extend in general in the left hand and right hand weft, and between these threads there occur a large number of points of intersection. "Warp threads" are threads which extend parallel to the centre axis of the tubular sheath, with the braiding being effected in such a way that the threads remain held by the helical threads.

In previously proposed processes for the production of tubular sheaths starting from such material, the avoidance of undesired effects such as the displacement of the threads in the braid and the like, (as can be caused for example at the bend B in FIG. 5), has required the rise of a material with very close braiding. This is however undesirable from both the technical and economical viewpoint. Importantly, with the apparatus in accordance with the present invention, it has only now become possible to choose a braiding of such a type chosen solely with reference to the product which is to be produced and without unnecessary consideration regarding the procedure by which the product is obtained.

The invention relates especially to apparatus for making preliminary sheaths of arbitrarily selected geometrical shape. Examples of some different forms of tubular sheaths are shown at 7A through 7E in FIG. 4.

Which form is to be chosen for the electrodes in a given battery depends on the field of application of this battery. In this connection, for example, attention has to be paid to the different currents it is desired to be able to take from the battery, perhaps to the possibilities of electrolyte circulation to the requirements set by the external shape of the battery box or cell case and so on. With the apparatus according to the present invention, the sheath can be manufactured while meeting the requirements which are set regarding the uniformity of the sheath material and regular distribution of threads over the whole surface of the sheath. As a result, uniform porosity of the sheath can be achieved.

Feeding of the tubular sheath during a continuous production operation can be effected as desired. For example, feed rollers can be employed which are oriented in accordance with the particular configuration of the sheath. Of course, the absence of any interference with sheath movement, such as by the bend B in FIG. 5, facilitates a convenient feeding action.

To ensure that sheathing products formed on the mandrel 6 should maintain their shape after removal from the mandrel 6, the treatment should be carried out in an appropriate manner. This result can be effected, for example, by a softening or melting of threads of thermoplastic with a low melting point inserted in the material, or by the sheath material being subjected to a preliminary impregnation with a stiffening substance. The apparatus according to the present invention offers special advantages with regard to such an impregnation. The substance with which the impregnation is carried out can for example be a thermosetting plastic, wherein the tubular sheath after the carrying out of the impregnation, is passed through a drying and curing furnace. Also, the stiffening substance can be for example a soluble resin which is applied in solution after which the tubular sheath is dried. A soluble impregnant of this kind is applied in the closing stage of the electrode production.

A mandrel which is suitable for such a treatment is disclosed in commonly assigned U.S. application Ser. No. 662,904 filed by the present inventors on Mar. 1, 1976 and entitled "Process and Apparatus for Producing Sheath Coverings for Electrodes."

The advantages of the present invention are however especially apparent when the impregnating is effected with a thermosetting plastic, which also brings certain advantages in the finished product. Regarding this impregnation substance, it is essential that the quantity of thermosetting plastic used is exactly right so that an adequate rigidity of the finished product is obtained with the least possible loss of porosity. This means that for optimum results, it is necessary to obtain a uniform application of the impregnating substance on the sheathing material. As will be recalled from an earlier discussion, the present invention enables a braided material of uniform porosity, etc. to be employed due to the low tendency for the threads to be displaced during feeding. Therefore, it is possible to obtain with a suitable dosing arrangement a continuous feed of an exactly correct quantity of impregnating agent which is thereupon spread uniformly over the whole sheathing material because of the uniformity of the material made possible by the apparatus according to the invention.

In sum then, there is minimal compressing, bending, twisting, etc. of the sheathing material during feeding due to the free suspension of the mandrel in accordance with the present invention. Therefore, a braided sheathing material can be employed which will retain a uniform porosity. This further enables a more effective stiffening of the sheath to be achieved, if desired. The lack of descriptive action upon the sheathing material during feeding greatly simplifies many phases of feeding and treating of the sheath. Also, in the event that electromagnetism is utilized to hold the mandrel, the mandrel is heated by the electromagnetic field, thereby aiding in heating of the sheath.

Although the invention has been described in connection with a preferred embodiment thereof, it will be appreciated by those skilled in the art that additions, modification, substitutions and deletions not specifically described may be made without departing from the spirit and scope of the invention as defined in the appended claims.

We claim:
1. Apparatus for supporting a sheathing material comprising:
   a mandrel comprising a sheath feed-in section, a sheath discharge section, a plurality of sections of magnetically conductive material disposed between said feed-in and discharge sections, and a plurality of essentially magnetically non-conductive sections disposed on opposite sides of and between said magnetically conductive sections to separate said magnetically conductive sections from each other and from said feed-in and discharge sections; and
   a plurality of spaced magnets containing aligned circular apertures,
       said magnetically conductive sections being respectively disposed within said apertures and being centered therewithin by magnetic fields from said magnets applied uniformly around the periphery of said magnetically conductive sections;
       each magnetically conductive section forming a gap with its associated magnet sufficiently large to allow sheathing material to pass through said magnets.
2. Apparatus according to claim 1 wherein said magnetically conductive material is steel and said magnetically non-conductive material is one of copper aluminum and alloys of copper and aluminum.
3. Apparatus according to claim 1 wherein said magnet means comprises an electromagnet.

* * * * *